US006827032B1

(12) United States Patent
Wobben

(10) Patent No.: US 6,827,032 B1
(45) Date of Patent: Dec. 7, 2004

(54) LANDING STAGE

(76) Inventor: Aloys Wobben, Argestrasse 19, Aurich D-26607 (DE)

( * ) Notice: Subject to any disclaimer, the term of this patent is extended or adjusted under 35 U.S.C. 154(b) by 0 days.

(21) Appl. No.: 10/088,947
(22) PCT Filed: Jul. 15, 2000
(86) PCT No.: PCT/EP00/06765
  § 371 (c)(1),
  (2), (4) Date: Sep. 16, 2002
(87) PCT Pub. No.: WO01/23253
  PCT Pub. Date: Apr. 5, 2001

(30) Foreign Application Priority Data

Sep. 30, 1999  (DE) .......................................... 199 46 899

(51) Int. Cl.⁷ .............................................. B63B 21/00
(52) U.S. Cl. .................. 114/230.1; 114/264; 405/195.1
(58) Field of Search ........................ 114/230.1, 230.14, 114/230.15, 249, 250, 264, 265; 405/195.1, 223.1, 224; 415/2.1; 417/100

(56) References Cited

U.S. PATENT DOCUMENTS

| 4,003,473 A | * | 1/1977 | Ryan ..................... 114/230.14 |
| 4,180,362 A | * | 12/1979 | Stair ....................... 414/139.5 |
| 4,294,331 A | * | 10/1981 | Reynoir et al. ............. 114/264 |
| 4,316,704 A | * | 2/1982 | Heidt ......................... 417/100 |
| 4,721,412 A | | 1/1988 | King et al. .................. 405/195 |
| 5,423,632 A | * | 6/1995 | Ekvall et al. ............ 405/223.1 |
| 5,549,445 A | * | 8/1996 | Schremp ..................... 415/2.1 |
| 5,651,640 A | * | 7/1997 | Huete et al. ............. 405/223.1 |

FOREIGN PATENT DOCUMENTS

| BE | 876855 A | 10/1979 |
| GB | 2105392 A | 3/1983 |
| JP | 03213492 | 9/1991 |

* cited by examiner

Primary Examiner—Lars A. Olson
(74) Attorney, Agent, or Firm—Seed Intellectual Property Law Group PLLC

(57) ABSTRACT

Offshore wind power installations usually require a landing stage or landing pier so that craft, in particular ships, can guarantee supply and transportation services. In the case of small offshore installations, these are usually simple jetties with possible ways of making boats fast. In the case of larger offshore installations at which larger supply ships land, the landing installations are of a more expensive and complicated structure and have for example supply intermediate storage facilities such as fuel tanks and loading equipment such as cranes.

21 Claims, 2 Drawing Sheets

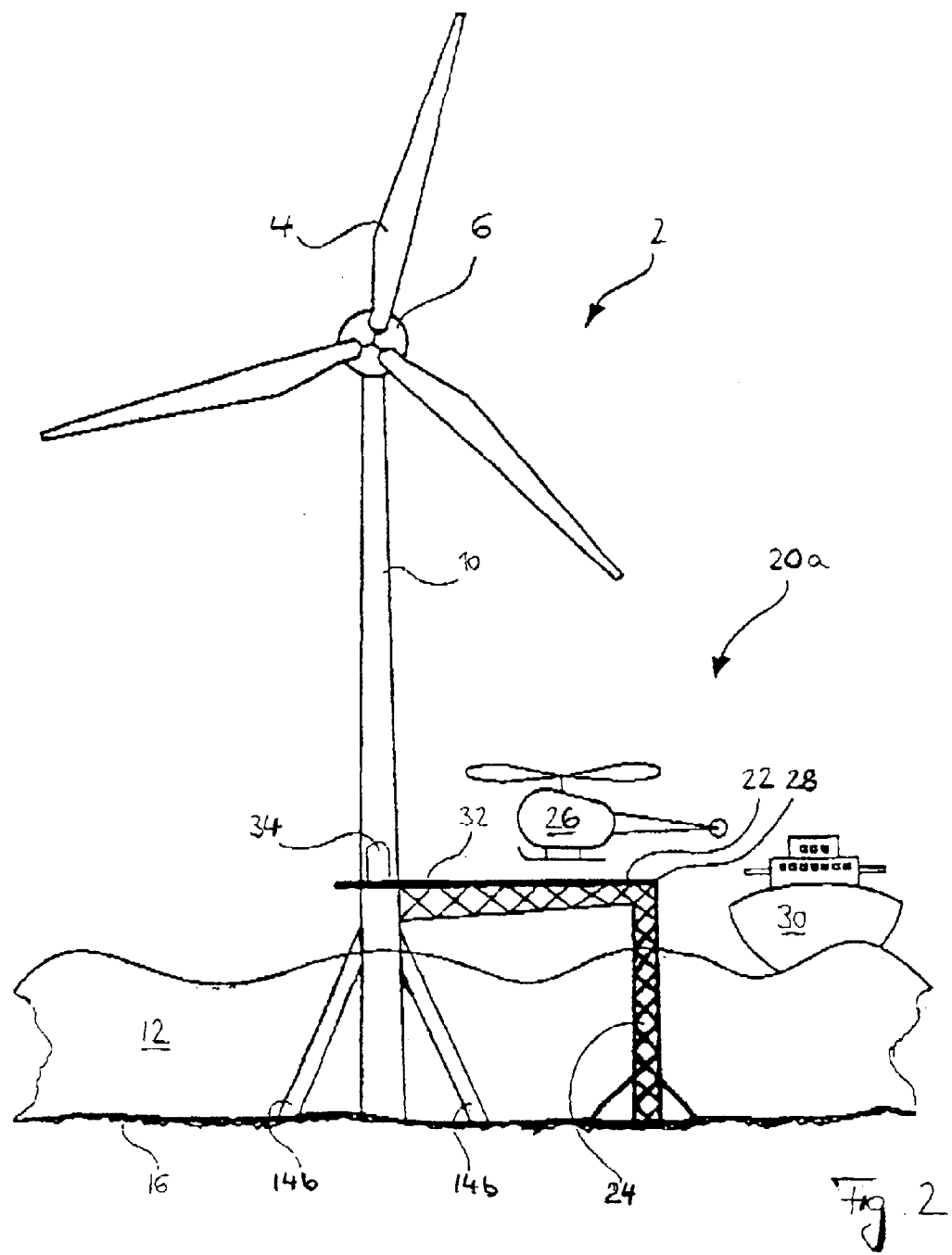

LANDING STAGE

TECHNICAL FIELD

The present invention concerns a landing stage, in particular for offshore wind power installations.

BACKGROUND OF THE INVENTION

Offshore wind power installations usually require a landing stage or landing pier so that craft, in particular ships, can guarantee supply and transportation services. In the case of small offshore installations, these are usually simple jetties with possible ways of making boats fast. In the case of larger offshore installations at which larger supply ships land, the landing installations are of a more expensive and complicated structure and have for example supply intermediate storage facilities such as fuel tanks and loading equipment such as cranes.

Helicopters, because of their lower service load capacity, are usually employed for the rapid transportation of personnel.

If, because of high wind speeds and a heavy sea, it is difficult for ships to land, to the point of being impossible, then helicopters temporarily represent the only supply and transportation option. Many offshore installations which do not have any landing area for helicopters, under such weather conditions, can then be supplied with a helicopter only in such a way that the helicopter which has flown to the installation remains in the air and supply or inspection is effected for example by means of a cable winch on the helicopter. Maneuvers of that kind are difficult and dangerous.

Offshore wind parks comprising a plurality of individual wind power installations which are disposed in the sea but also other, for example small, individual offshore installations, by virtue of their construction, afford scarcely any possible way of providing a landing area for helicopters on them. In addition, in the case of wind power installations, the danger to the helicopter as it flies towards the installation, due to the rotating rotor blades of the wind power installation, represents an addition serious problem.

The separate arrangement of the mooring location or berth for ships on the foundation legs and of the landing area for the helicopter at a higher position on the drilling rig, as is known from offshore drilling rigs, is essentially out of the question, because of the rotor being arranged at that location in the case of wind power installations, and, under the constricted situation in terms of space on offshore installations, because of separately required logistics and the respective space required for same, results in a disadvantageous waste of building space.

SUMMARY OF THE INVENTION

The object of the present invention is to provide a landing stage for ships and for helicopters, which while being of a simple structure can be used on offshore and shore installations.

That object is attained by a landing stage having the features set forth in claim 1. Advantageous configurations of the invention are set out in the appendant claims.

In accordance with the invention a landing stage has a mooring location or berth for ships and a landing area for helicopters. The landing stage is disposed in particular on offshore wind power installations, but also on installations which are erected on a bank or shore. In accordance with the invention in that case there is a common route link from the mooring location and the landing area to the installation. In that way, in accordance with the invention, logistical devices can be set up in such a way that they can be used jointly for the mooring location and the landing area. These are for example buildings in which landed people can (initially) seek protection, materials which have been landed or which are ready for collection can be held in intermediate store, but also fuel stores which are arranged together as well as navigational aids which can include signal navigation lights, radio direction-finding transmitters, but also pilot rooms with radar surveillance. Because in particular offshore installations of any kind are substantially basically highly restricted in terms of their space aspects, a concentration in accordance with the invention of logistically relevant locations (transport interface for ships and helicopters from the installation to the outside world) is extremely advantageous. The common landing stage, preferably with the jointly usable logistical devices, advantageously concentrates in accordance with the invention transport from the landing stage by way of the common route link to the installation where then further distribution from the common route link can be effected in any desired manner in a logistically simply plannable fashion.

The landing stage according to the invention is preferably mounted to an offshore wind power installation whose generator is driven by a rotor which rotates at the tip (pod) of a pylon about a horizontal axis. In that case the landing area for helicopters, in order to guarantee safe take-offs and landings, is remote from the pylon preferably by at least a third of the length of a rotor blade.

Preferably the landing stage according to the invention has independent foundations in the sea, that is to say the mooring location and the landing area are supported on a foundation on the seabed or supported floatingly on the surface of the water, more specifically individually or separately from each other and in then any combination of the kind of support.

Preferably the landing stage is disposed laterally of the installation at the prevailing lee side of the installation. In that way the landing stage is advantageously disposed in the region of the installation which is sheltered from the wind, so that both wind and also sea swell break against the installation and only act with an alleviated force on the landing stage.

In accordance with the invention, that effect is further enhanced if the landing stage is preferably mounted rotatably about the offshore installation and is thus always oriented into the lee side of the installation by the afflux flow of wind. Particularly suitable for this embodiment of the invention is the floating foundation for the landing stage, which for example can be in the form of a pontoon of large area, which can be connected by way of a bridge for example to the base region of an offshore wind power installation and then is supported there for example by means of a ring sleeve or a rotor member on the periphery of the base. When applied to wind power installations, that design configuration has an additional substantial advantage: the greatly projecting rotating rotor blades of the generator propeller represent a major danger to a helicopter flying towards the installation. If now however in accordance with the invention the landing stage is oriented by the wind into the lee side of the wind power installation, the air space above the landing stage is at any event outside the rotational range of the generator propeller for the latter is in accordance with its function oriented transversely with respect to the lee side against the wind—in other words: in relation to the wind direction, the plane of rotary movement of the generator propeller is then perpendicularly markedly upstream of the air space above the landing stage and does not cut through the air space. Furthermore, the helicopter can advantageously come in to land on the landing area against the wind without being impeded by the installation.

The embodiment of the landing stage according to the invention with the floating foundation also has the advantage that in respect of its height it follows the movement of the tides, which is of substantial advantage for the mooring location of the ships.

The landing stage according to the invention is preferably a structure made up of any combination of steel framework, plates, concrete and/or wood with suitable corrosion protection in relation to sea water and other environmental influences.

BRIEF DESCRIPTION OF THE FIGURES

Preferred embodiments of the invention are described hereinafter with reference to the accompanying drawings in which:

FIG. 2 shows a side view of a second embodiment of the present invention.

DETAILED DESCRIPTION OF THE PREFERRED EMBODIMENT

Figure 1:
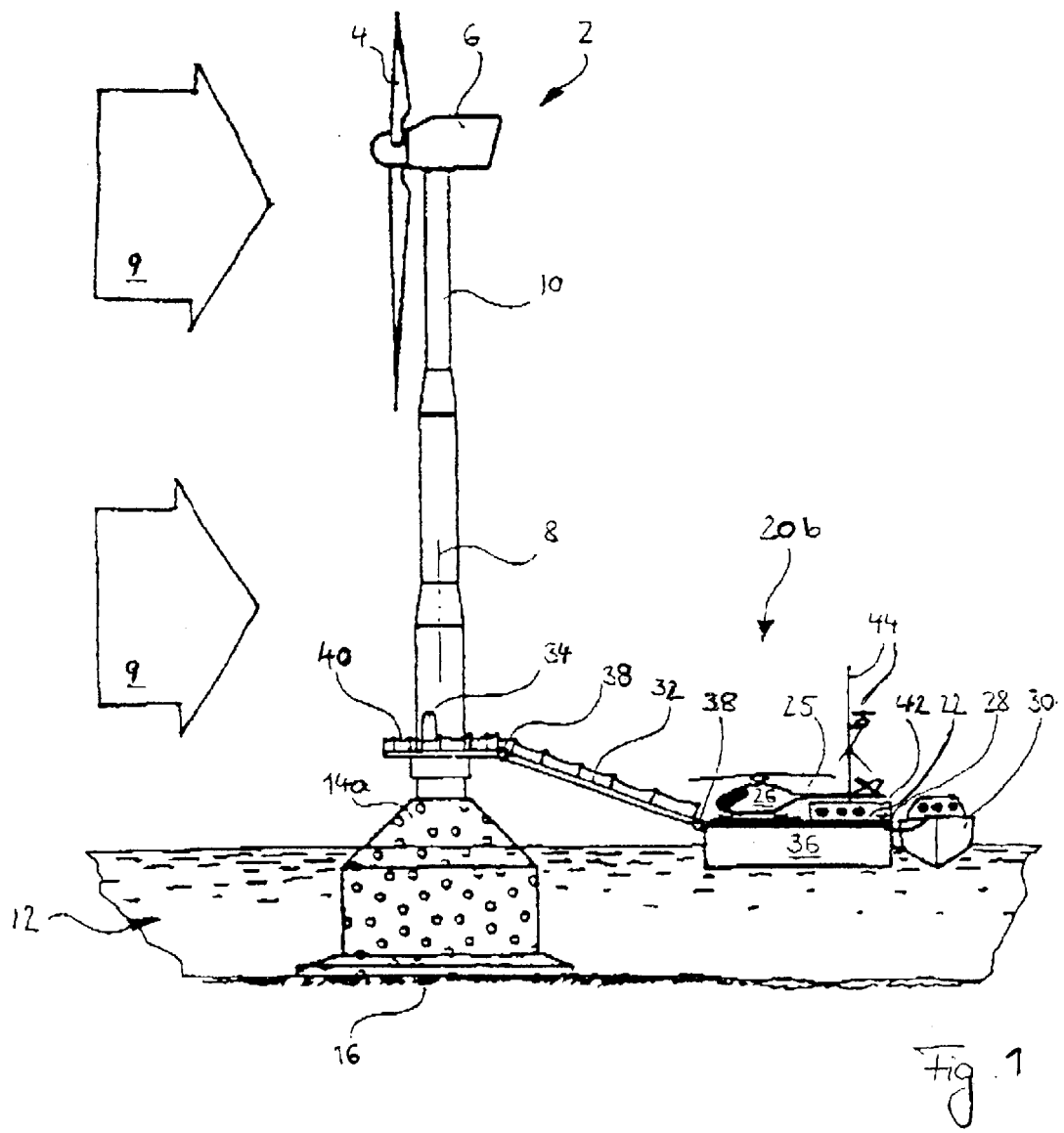
FIG. 1 shows a side view of a first embodiment of the present invention.

In the two Figures, identical components or components which correspond to each other in any way are denoted by the same references. With reference to FIGS. 1 and 2, shown therein is an offshore wind power installation 2 with a rotor 4 with a substantially horizontal axis of rotation. The rotor 4 is connected or coupled to a generator (not shown) in a pod 6. The pod 6 (or the illustrated machine housing) can be oriented about a vertical axis 8 with respect to the current wind direction 9 by a transmission arrangement (not shown) which is also arranged in the pod.

The pod 6 with the rotor 4 is mounted on the tip of a pylon 10 rotatably about the axis 8.

The pylon 10 of the wind power installation 2 is fixedly erected in the sea 12 as shown in FIG. 1 by means of a foundation 14a of concrete and as shown in FIG. 2 by means of lateral struts 14b on the seabed 16.

The wind power installations 2 shown in both FIG. 1 and also FIG. 2 each have a landing stage 20a, 20b. The landing stage 20a shown in FIG. 2 is in the form of a steel framework structure with a concrete platform 22 and is secured fixedly to the pylon 10 of the wind power installation 2 laterally of the installation 2 and is fixedly supported by way of a steel lattice pillar 24 itself in the sea 12 on the seabed 16.

The horizontal concrete platform 22 at the top side forms a landing area 25 for a helicopter 26. In particular at the edge 28 of the platform 22, which is most remote from the pylon 10, the platform 22 together with the pillar 24 which projects perpendicularly downwardly from that edge 28 to the seabed 16 forms a mooring location or berth in the form of a pier for ships 30.

Both the landing area 25 for helicopters 26 and also the mooring location 28 for ships 30 are connected by way of the platform 22 which is fixed to the pylon 10 by a common route link 32 between on the one hand the landing area and the mooring location 28 and on the other hand the pylon 10 of the wind power installation 2. Thus, personnel and equipment which are transloaded by means of the helicopter 26 or the ship 30 on the landing stage 20, by way of the common route link 32, follow a common path through a door 34 into the pylon 10 where for example by means of an elevator (not shown) they can be conveyed in the pylon 10 to the pod 6 at the tip thereof, if for example repair or maintenance operations have to be carried out there.

The landing stage 20a, in relation to a prevailing wind direction at the location of the wind power installation 2, is disposed at the lee side thereof and is securely fixed there, as described. In that way, the force of wind and sea swell both against the landing area 25 and also against the mooring location 28 is broken by the pylon when wind is blowing from the prevailing direction.

Safe take-offs and landings of helicopters 26 on the landing area 25 are guaranteed by a sufficiently large vertical distance between the landing area 25 and the diameter described by the tips of the rotor blades 4.

Referring now to FIG. 1 the wind power installation 2 has a landing stage 20b which differs from the landing stage 20a in FIG. 2 by the features described hereinafter.

The landing stage 20b shown in FIG. 1 is a steel plate/steel framework structure whose concrete platform 22 is supported on a pontoon 36. Disposed in the interior of the pontoon 36 are storage spaces (not shown). The platform 22 whose top side, as already described with reference to FIG. 2, forms the landing area 25 for helicopters 26 and whose lateral edges form the mooring location 28 for ships 30, is therefore not fixedly anchored in the sea on the seabed 16 but floats on the surface of the sea 12. As a result, there is always an identical vertical spacing between the platform 22 and the surface of the sea 12, which is of substantial advantage in particular for loading and unloading ships 30.

The platform 22 with the landing area 25 and the mooring location 28 on the floating platform 36 is connected to the pylon 10 of the wind power installation 2 by way of a bridge 32. The bridge 32 thus forms the common route link from the landing area 25 and the mooring location 28 to the pylon 10 of the wind power installation 2. The bridge 32 is supported both on the pontoon 36 and also the pylon 10 firstly pivotably about a respective horizontal axis. Those mounting locations 38 ensure that the floating pontoon 36 is freely enabled to perform vertical movement by virtue of the movement of tides in the sea 12.

The landing stage 20b shown in FIG. 1 is also connected by way of the bridge 32 rotatably about the vertical axis 8 of the pylon 10 of the wind power installation 2. In that way the landing stage 20b, connected to the pylon 10 by way of the bridge 32, can float freely at a given spacing around the pylon 10. In that situation it is oriented by the wind direction 9 at the time. That provides firstly that the landing stage 20b is always at the lee side of the wind power installation 2 that is to say not only with the prevailing wind direction but with any current wind direction—and is thus always protected by the pylon 10 from the influences of wind and swell. So that the pontoon 36 can float as smoothly as possible on the sea, structural measures are known, for example the pontoon 36 should be as heavy and as of large surface area as possible. A second advantage of the landing stage 20b being oriented by the wind 10 to assume a position in the lee of the wind power installation 2 concerns flight safety when helicopters 26 are taking off from and landing on the landing stage 20b: by virtue of the fact that the propeller 4 of the wind power installation 2 is always oriented in the wind direction 9, the airspace above the landing stage 20b, as shown in FIG. 1, which is oriented towards the lee side, does not in any case have the rotor blades 4 of the wind power installation 2 passing therethrough. The helicopter 26 can thus take off and land vertically without hindrance and can fly to the landing stage 20b against the wind without being impeded by the wind power installation 2.

The described rotatable support for the landing stage 20b about the pylon 10 is afforded by an annular 'balcony' 40 which is rotatable in the form of a sleeve about a region at the lower end of the pylon 10. The balcony 40 is fixed on the pylon 10 in the vertical direction so that the door 34 in the pylon 10 is at any event always accessible from the balcony 40.

It is possible to see on the landing stage 20b buildings 42 which can be used jointly from the landing area 25 and the mooring location 28 and navigational aids 44.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A landing stage for an offshore wind power installation, comprising:
   a mooring location for ships;
   a landing area for helicopters; and
   a common route link from the mooring location and the landing area to the installation, the mooring location and landing area being on a common platform, and wherein the landing stage is rotatable about the installation about a vertical axis.

2. The landing stage according to claim 1 wherein the mooring location and the landing area in addition to the foundation of the installation in the sea have their own foundation.

3. The landing stage according to claim 1 wherein the landing stage is arranged at the lee side of the installation in relation to a prevailing wind direction at the location of the installation.

4. The landing stage according to claim 1 wherein the landing stage is supported floatingly in the sea.

5. The landing stage according to claim 1, further including: logistical and/or infrastructural items of equipment which can be jointly used at the mooring location and the landing area.

6. The landing stage according to claim 5 wherein the items of equipment are jointly usable buildings for the storage, intermediate storage and preparation of articles which are transloaded at the mooring location and/or the landing area, and/or buildings for means which serve for the supply and/or operation of the craft using the landing stage, and/or residential buildings for personnel seeking protection and/or for maintenance personnel, who travel with the craft and/or are used for movement of the craft.

7. The landing stage according to claim 5, wherein jointly usable navigational aids are selected from the group consisting of radial, direction-finding transmitters, light signaling installations and radar equipment.

8. The landing stage according to claim 1 comprising a concrete platform at a side, on which the landing area is arranged with the mooring location disposed at the edge thereof.

9. The landing stage according to claim 1 further including a steel framework and/or steel plate structure.

10. The offshore wind power installation according to claim 1 wherein the landing area is horizontally remote from a pylon of the wind power installation by at least two-thirds of the length of a rotor blade.

11. A landing stage for an offshore wind power installation, comprising:
    a mooring location for ships;
    a landing area for helicopters; and
    a common route link from the mooring location and the landing area to the installation, the mooring location and landing area being on a common platform, wherein the landing stage is positioned relative to a prevailing wind direction of the wind power installation.

12. The landing stage according to claim 11 wherein the mooring location and the landing area in addition to the foundation of the installation in the sea have their own foundation.

13. The landing stage according to claim 11 wherein the landing stage is arranged at the lee side of the installation and is disposedly fixed at the lee side of the installation.

14. The landing stage according to claim 11 wherein the foundation of the landing stage is arranged on the seabed.

15. The landing stage according to claim 11 wherein the landing stage is supported floatingly in the sea.

16. The landing stage according to claim 11, further including: logistical and/or infrastructural items of equipment which can be jointly used at the mooring location and the landing area.

17. The landing stage according to claim 16 wherein the items of equipment are jointly usable buildings for the storage, intermediate storage and preparation of articles which are transloaded at the mooring location and/or the landing area, and/or buildings for means which serve for the supply and/or operation of the craft using the landing stage, and/or residential buildings for personnel seeking protection and/or for maintenance personnel, who travel with the craft and/or are used for movement of the craft.

18. The landing stage according to claim 17, wherein jointly usable navigational aids are selected from the group consisting of radial, radio direction-finding transmitters, light signaling installations and radar equipment.

19. The landing stage according to claim 11 comprising a concrete platform at a side, on which the landing area is arranged with the mooring location disposed at the edge thereof.

20. The landing stage according to claim 11 further including a steel framework and/or steel plate structure.

21. The offshore wind power installation according to claim 11 wherein the landing area is horizontally remote from a pylon of the wind power installation by at least two-thirds of the length of a rotor blade.

* * * * *